(12) United States Patent
Park et al.

(10) Patent No.: US 8,935,293 B2
(45) Date of Patent: Jan. 13, 2015

(54) FRAMEWORK FOR DYNAMICALLY GENERATING TUPLE AND PAGE CLASSES

(75) Inventors: Hoyong Park, San Jose, CA (US);
Namit Jain, Santa Clara, CA (US);
Anand Srinivasan, Bangalore (IN);
Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1027 days.

(21) Appl. No.: 12/396,464

(22) Filed: Mar. 2, 2009

(65) Prior Publication Data

US 2010/0223606 A1    Sep. 2, 2010

(51) Int. Cl.
G06F 7/00      (2006.01)
G06F 17/30     (2006.01)
G06F 9/445     (2006.01)
G06F 9/455     (2006.01)

(52) U.S. Cl.
CPC ........ G06F 9/44521 (2013.01); G06F 9/45504 (2013.01)
USPC ............................ 707/801; 707/803; 717/166

(58) Field of Classification Search
CPC .................................................. G06F 9/44521
USPC .......... 717/162, 163, 165, 166; 707/801, 802, 707/803
See application file for complete search history.

(56) References Cited

U.S. PATENT DOCUMENTS

| | | | |
|---|---|---|---|
| 5,802,523 A | 9/1998 | Jasuja et al. | |
| 5,850,544 A * | 12/1998 | Parvathaneny et al. | 717/108 |
| 5,918,225 A | 6/1999 | White et al. | |
| 5,920,716 A | 7/1999 | Johnson et al. | |
| 5,937,195 A | 8/1999 | Ju et al. | |
| 6,011,916 A * | 1/2000 | Moore et al. | 717/104 |
| 6,041,344 A | 3/2000 | Bodamer et al. | |
| 6,112,198 A | 8/2000 | Lohman et al. | |
| 6,158,045 A | 12/2000 | You | |
| 6,341,281 B1 | 1/2002 | MacNicol et al. | |
| 6,397,262 B1 | 5/2002 | Hayden et al. | |
| 6,418,448 B1 | 7/2002 | Sarkar | |
| 6,439,783 B1 | 8/2002 | Antoshenkov | |
| 6,615,203 B1 | 9/2003 | Lin et al. | |

(Continued)

FOREIGN PATENT DOCUMENTS

WO    2012050582    4/2012

OTHER PUBLICATIONS

Hulten et al, Mining Time-Changing Data Stream, Proceedings of the Seventh ACM SIGKDD International Conference on Knowledge Discovery and Data Mining, Aug. 2001, pp. 10.*

(Continued)

*Primary Examiner* — Marc Somers
(74) *Attorney, Agent, or Firm* — Kilpatrick Townsend and Stockton LLP

(57) ABSTRACT

Techniques for reducing the memory used for processing events received in a data stream are provided. This may be achieved by reducing the memory required for storing tuples. A method for processing a data stream includes receiving a tuple and determining a tuple specification that defines a layout of the tuple. The layout identifies one or more data types that are included in the tuple. A tuple class corresponding to the tuple specification may be determined. A tuple object based on the tuple class is instantiated, and during runtime of the processing system. The tuple object is stored in a memory.

15 Claims, 9 Drawing Sheets

(56) References Cited

U.S. PATENT DOCUMENTS

| | | | |
|---|---|---|---|
| 6,681,343 B1 | 1/2004 | Nakabo | |
| 6,718,278 B1 | 4/2004 | Steggles | |
| 6,748,386 B1 | 6/2004 | Li | |
| 6,751,619 B1* | 6/2004 | Rowstron et al. | 707/10 |
| 6,766,330 B1 | 7/2004 | Chen et al. | |
| 6,850,925 B2 | 2/2005 | Chaudhuri et al. | |
| 6,996,557 B1 | 2/2006 | Leung et al. | |
| 7,051,034 B1 | 5/2006 | Ghosh et al. | |
| 7,062,749 B2 | 6/2006 | Cyr et al. | |
| 7,080,062 B1 | 7/2006 | Leung et al. | |
| 7,167,848 B2 | 1/2007 | Boukouvalas et al. | |
| 7,203,927 B2 | 4/2007 | Al-Azzawe et al. | |
| 7,383,253 B1 | 6/2008 | Tsimelzon et al. | |
| 7,519,962 B2 | 4/2009 | Aman | |
| 7,533,087 B2 | 5/2009 | Liu et al. | |
| 7,546,284 B1 | 6/2009 | Martinez et al. | |
| 7,580,946 B2 | 8/2009 | Mansour et al. | |
| 7,587,383 B2 | 9/2009 | Koo et al. | |
| 7,603,674 B2 | 10/2009 | Cyr et al. | |
| 7,634,501 B2* | 12/2009 | Yabloko | 707/104.1 |
| 7,653,645 B1 | 1/2010 | Stokes | |
| 7,672,964 B1 | 3/2010 | Yan et al. | |
| 7,693,891 B2 | 4/2010 | Stokes et al. | |
| 7,702,639 B2 | 4/2010 | Stanley et al. | |
| 7,711,782 B2 | 5/2010 | Kim et al. | |
| 7,823,066 B1 | 10/2010 | Kuramura | |
| 7,827,146 B1* | 11/2010 | De Landstheer et al. | 707/651 |
| 7,844,829 B2 | 11/2010 | Meenakshisundaram | |
| 7,877,381 B2 | 1/2011 | Ewen et al. | |
| 7,895,187 B2 | 2/2011 | Bowman | |
| 7,945,540 B2 | 5/2011 | Park et al. | |
| 7,954,109 B1 | 5/2011 | Durham et al. | |
| 7,987,204 B2 | 7/2011 | Stokes | |
| 8,032,544 B2* | 10/2011 | Jing et al. | 707/760 |
| 8,046,747 B2 | 10/2011 | Cyr et al. | |
| 8,099,400 B2 | 1/2012 | Haub et al. | |
| 8,134,184 B2 | 3/2012 | Becker et al. | |
| 8,155,880 B2 | 4/2012 | Patel et al. | |
| 8,195,648 B2 | 6/2012 | Zabback et al. | |
| 8,204,873 B2 | 6/2012 | Chavan | |
| 8,290,776 B2 | 10/2012 | Moriwaki et al. | |
| 8,296,316 B2 | 10/2012 | Jain et al. | |
| 8,315,990 B2 | 11/2012 | Barga et al. | |
| 8,392,402 B2 | 3/2013 | Mihaila et al. | |
| 8,447,744 B2 | 5/2013 | Alves et al. | |
| 8,458,175 B2 | 6/2013 | Stokes | |
| 8,498,956 B2 | 7/2013 | Srinivasan et al. | |
| 8,527,458 B2 | 9/2013 | Park et al. | |
| 8,589,436 B2 | 11/2013 | Srinivasan et al. | |
| 8,676,841 B2 | 3/2014 | Srinivasan et al. | |
| 2002/0023211 A1 | 2/2002 | Roth et al. | |
| 2002/0032804 A1 | 3/2002 | Hunt | |
| 2002/0038313 A1 | 3/2002 | Klein et al. | |
| 2002/0049788 A1 | 4/2002 | Lipkin et al. | |
| 2003/0046673 A1* | 3/2003 | Copeland et al. | 717/163 |
| 2003/0120682 A1 | 6/2003 | Bestgen et al. | |
| 2003/0135304 A1 | 7/2003 | Sroub et al. | |
| 2004/0019592 A1 | 1/2004 | Crabtree | |
| 2004/0117359 A1 | 6/2004 | Snodgrass et al. | |
| 2004/0151382 A1 | 8/2004 | Stellenberg et al. | |
| 2004/0153329 A1 | 8/2004 | Casati et al. | |
| 2004/0201612 A1 | 10/2004 | Hild et al. | |
| 2004/0205082 A1 | 10/2004 | Fontoura et al. | |
| 2004/0220896 A1 | 11/2004 | Finlay et al. | |
| 2004/0268314 A1 | 12/2004 | Kollman et al. | |
| 2006/0007308 A1 | 1/2006 | Ide et al. | |
| 2006/0015482 A1 | 1/2006 | Beyer et al. | |
| 2006/0047696 A1 | 3/2006 | Larson et al. | |
| 2006/0080646 A1 | 4/2006 | Aman | |
| 2006/0282429 A1* | 12/2006 | Hernandez-Sherrington et al. | 707/6 |
| 2007/0016467 A1 | 1/2007 | John et al. | |
| 2007/0050340 A1 | 3/2007 | von Kaenel et al. | |
| 2007/0156964 A1 | 7/2007 | Sistla | |
| 2007/0192301 A1 | 8/2007 | Posner | |
| 2007/0198479 A1 | 8/2007 | Cai et al. | |
| 2007/0226188 A1 | 9/2007 | Johnson et al. | |
| 2008/0010093 A1 | 1/2008 | LaPlante et al. | |
| 2008/0016095 A1 | 1/2008 | Bhatnagar et al. | |
| 2008/0033914 A1 | 2/2008 | Cherniack et al. | |
| 2008/0086321 A1 | 4/2008 | Walton | |
| 2008/0098359 A1 | 4/2008 | Ivanov et al. | |
| 2008/0235298 A1 | 9/2008 | Lin et al. | |
| 2008/0243675 A1 | 10/2008 | Parsons et al. | |
| 2008/0255847 A1 | 10/2008 | Moriwaki et al. | |
| 2008/0263039 A1 | 10/2008 | Van Lunteren | |
| 2008/0270764 A1 | 10/2008 | McMillen et al. | |
| 2008/0281782 A1 | 11/2008 | Agrawal | |
| 2008/0313131 A1 | 12/2008 | Friedman et al. | |
| 2009/0006346 A1 | 1/2009 | C N et al. | |
| 2009/0007098 A1 | 1/2009 | Chevrette et al. | |
| 2009/0024622 A1 | 1/2009 | Chkodrov et al. | |
| 2009/0076899 A1 | 3/2009 | Gbodimowo | |
| 2009/0088962 A1 | 4/2009 | Jones | |
| 2009/0112853 A1 | 4/2009 | Nishizawa et al. | |
| 2009/0172014 A1 | 7/2009 | Huetter | |
| 2009/0187584 A1 | 7/2009 | Johnson et al. | |
| 2009/0228434 A1 | 9/2009 | Krishnamurthy et al. | |
| 2009/0254522 A1 | 10/2009 | Chaudhuri et al. | |
| 2009/0257314 A1 | 10/2009 | Davis et al. | |
| 2009/0293046 A1 | 11/2009 | Cheriton | |
| 2009/0300093 A1 | 12/2009 | Griffiths et al. | |
| 2009/0300181 A1 | 12/2009 | Marques | |
| 2009/0300580 A1 | 12/2009 | Heyhoe et al. | |
| 2009/0300615 A1 | 12/2009 | Andrade et al. | |
| 2009/0327102 A1 | 12/2009 | Maniar et al. | |
| 2010/0017379 A1 | 1/2010 | Naibo et al. | |
| 2010/0017380 A1 | 1/2010 | Naibo et al. | |
| 2010/0036831 A1 | 2/2010 | Vemuri | |
| 2010/0106946 A1 | 4/2010 | Imaki et al. | |
| 2010/0312756 A1 | 12/2010 | Zhang et al. | |
| 2010/0318652 A1 | 12/2010 | Samba | |
| 2011/0040746 A1 | 2/2011 | Handa et al. | |
| 2011/0093162 A1 | 4/2011 | Nielsen et al. | |
| 2011/0173231 A1 | 7/2011 | Drissi et al. | |
| 2011/0173235 A1 | 7/2011 | Aman et al. | |
| 2011/0314019 A1 | 12/2011 | Jimenez Peris et al. | |
| 2011/0321057 A1 | 12/2011 | Mejdrich et al. | |
| 2012/0130963 A1 | 5/2012 | Luo et al. | |
| 2012/0166469 A1 | 6/2012 | Cammert et al. | |
| 2012/0191697 A1 | 7/2012 | Sherman et al. | |
| 2012/0259910 A1 | 10/2012 | Andrade et al. | |
| 2013/0144866 A1 | 6/2013 | Jerzak et al. | |
| 2014/0095444 A1 | 4/2014 | Deshmukh et al. | |
| 2014/0095445 A1 | 4/2014 | Deshmukh et al. | |
| 2014/0095446 A1 | 4/2014 | Deshmukh et al. | |
| 2014/0095447 A1 | 4/2014 | Deshmukh et al. | |
| 2014/0095462 A1 | 4/2014 | Park et al. | |
| 2014/0095471 A1 | 4/2014 | Deshmukh et al. | |
| 2014/0095473 A1 | 4/2014 | Srinivasan et al. | |
| 2014/0095483 A1 | 4/2014 | Toillion et al. | |
| 2014/0095525 A1 | 4/2014 | Hsiao et al. | |
| 2014/0095529 A1 | 4/2014 | Deshmukh et al. | |
| 2014/0095533 A1 | 4/2014 | Shukla et al. | |
| 2014/0095535 A1 | 4/2014 | Deshmukh et al. | |
| 2014/0095537 A1 | 4/2014 | Park et al. | |
| 2014/0095540 A1 | 4/2014 | Hsiao et al. | |
| 2014/0095541 A1 | 4/2014 | Herwadkar et al. | |
| 2014/0095543 A1 | 4/2014 | Hsiao et al. | |
| 2014/0172914 A1 | 6/2014 | Elnikety et al. | |

OTHER PUBLICATIONS

Swarthmore College, Strings in C, https://web.archive.org/web/20070612231205/http://web.cs.swarthmore.edu/~newhall/unixhelp/C_strings.html, Jun. 12, 2007, 3 pp.*

Esper Reference Documentation, Copyright 2009, ver. 3.1.0, 293 pages.

Nah et al. "A Cluster-Based THO-Structured Scalable Approach for Location Information Systems," The Ninth IEEE International Workshop on Object-Oriented Real-Time Dependable Systems (WORD' 03), pp. 225-233 (Jan. 1, 2003).

(56) References Cited

OTHER PUBLICATIONS

Stump et al. (ed.) Proceedings of IJCAR '06 Workshop "PLPV '06: Programming Languages meets Program Verification," pp. 1-113 (Aug. 21, 2006).

Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).

Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).

Wu et al. "Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).

Sansoterra "Empower SOL with Java User-Defined Functions," IT Jungle.com, Guild Companies, Inc., 9 pages (Oct. 9, 2003).

Ullman et al., "Introduction to JDBC," Stanford University, 7 pages (2005).

Non-Final Office Action for U.S. Appl. No. 12/957,194 dated Dec. 7, 2012, 11 pages.

Non-Final Office Action for U.S. Appl. No. 13/089,556 dated Nov. 6, 2012, 12 pages.

Notice of Allowance for U.S. Appl. No. 12/534,398 dated Nov. 27, 2012, 9 pages.

Notice of Allowance for U.S. Appl. No. 12/506,905 dated Dec. 14, 2012, 8 pages.

Non-Final Office Action for U.S. Appl. No. 12/957,201 dated Dec. 19, 2012, 13 pages.

Final Office Action for U.S. Appl. No. 12/913,636 dated Jan. 8, 2013, 20 pages.

Non-Final Office Action for U.S. Appl. No. 12/949,081 dated Jan. 9, 2013, 12 pages.

Final Office Action for U.S. Appl. No. 12/534,384 dated Feb. 12, 2013, 13 pages.

Final Office Action for U.S. Appl. No. 13/107,742 dated Feb. 14, 2013, 15 pages.

Non-Final Office Action for U.S. Appl. No. 13/102,665 dated Feb. 1, 2013, 11 pages.

Notice of Allowance for U.S. Appl. No. 11/977,437 dated Mar. 4, 2013. 9 pages.

Final Office Action for U.S. Appl. No. 13/244,272 dated Mar. 28, 2013, 29 pages.

Notice of Allowance for U.S. Appl. No. 12/957,194 dated Mar. 20, 2013. 9 pages.

Kawaguchi et al. "Java Architecture for XML Binding (JAXB) 2.2, " Sun Microsystems, Inc., Dec. 10, 1999, 384 pages.

U.S. Appl. No. 12/548,187, Final Office Action mailed on Jun. 10, 2013, 18 pages.

U.S. Appl. No. 12/548,222, Notice of Allowance mailed on Jul. 18, 2013, 12 pages.

U. S. Appl. No. 13/102,665, Final Office Action mailed Jul. 9, 2013, 17 pages.

U.S. Appl. No. 13/107,742, Final Office Action mailed on Jul. 3, 2013, 19 pages.

Notice of Allowance for U.S. Appl. No. 11/977,437 dated Jul. 10, 2013, 10 pages.

SQL Tutorial-In, Tizag.com, http://web.archive.org/web/20090216215219/http://www.tizag.com/sgiTutorial/sqlin.php, Feb. 16, 2009, pp. 1-3.

U.S. Appl. No. 12/548,281, Final Office Action mailed on Oct. 10, 2013, 21 pages.

U.S. Appl. No. 12/548,290, Notice of Allowance mailed on Sep. 11, 2013, 6 pages.

U.S. Appl. No. 12/949,081, Final Office Action mailed on Aug. 27, 2013, 13 pages.

U.S. Appl. No. 13/089,556, Final Office Action mailed on Aug. 29, 2013, 10 pages.

U.S. Appl. No. 13/177,748, Non-Final Office Action mailed on Aug. 30, 2013, 24 pages.

U.S. Appl. No. 13/193,377, Notice of Allowance mailed on Aug. 30, 2013, 19 pages.

Business Process Management (BPM), Datasheet [online]. IBM, [retrieved on Jan. 28, 2013]. Rerieved from the Internet: <URL: http://www-142.ibm.com/software/products/us/en/category/BPM-SOFTWARE>, 2 pp.

What is BPM?, Datasheet [online]. IBM, [retrieved on Jan. 28, 2013]. Retrieved from the Internet: <URL: http://www-01.ibm.com/sofware/info/bpm/whatis-bpm/>, 3 pp.

U.S. Appl. No. 12/534,384, Notice of Allowance mailed on May 7, 2013, 12 pages.

U.S. Appl. No. 12/548,187, Non-Final Office Action mailed on Apr. 9, 2013, 17 pages.

U.S. Appl. No. 12/548,222, Non-Final Office Action mailed on Apr. 10, 2013, 16 pages.

U.S. Appl. No. 12/548,281, Non-Final Office Action mailed on Apr. 12, 2013, 16 pages.

U.S. Appl. No. 12/548,290, Non-Final Office Action mailed on Apr. 15, 2013, 17 pages.

U.S. Appl. No. 12/957,201, Final Office Action mailed on Apr. 25, 2013, 11 pages.

U.S. Appl. No. 13/089,556, Non-Final Office Action mailed on Apr. 10, 2013, 10 pages.

U.S. Appl. No. 13/193,377, Final Office Action mailed on Jan. 17, 2013, 24 pages.

Ogrodnek, custom UDFs and hive, Bizo development blog http://dev.bizo.com., Jun. 23, 2009, 2 pp.

Oracle™ Fusion Middleware CQL Language Reference, 11g Release 1 (11.1.1.6.3) E12048-10, Aug. 2012, pp. 6-1 to 6-12.

Oracle™ Complex Event Processing CQL Language Reference, 11g Release 1 (11.1.1.4.0) E12048-04, Jan. 2011, pp. 6.1 to 6.12.

Oracle™ Complex Event Processing CQL Language Reference, 11g Release 1 (11.1.1) E12048-03, Apr. 2010, sections 18-4 to 18.4.2.

Pattern Recognition With MATCH_RECOGNIZE, Oracle™ Complex Event Processing CQL Language Reference, 11g Release 1 (11.1.1) E12048-01, May 2009, pp. 15.1 to 15.20.

Supply Chain Event Management: Real-Time Supply Chain Event Management, product information Manhattan Associates, 2009-2012, 1 pp.

U.S. Appl. No. 11/601,415, Non Final Office Action mailed on Dec. 11, 2013, 58 pages.

U.S. Appl. No. 13/089,556, Non-Final Office Action mailed on Jan. 9, 2014, 14 pages.

Non-Final Office Action for U.S. Appl. No. 12/548,187 dated Feb. 6, 2014, 53 pages.

Agrawal et al. "Efficient pattern matching over event streams," Proceedings of the 2008 ACM SIGMOD international conference on Management of data, pp. 147-160 (Jun. 2008).

Chandramouli et al., High-Performance Dynamic Pattern Matching over Disordered Streams, Proceedings of the VLDB Endowment, vol. 3 Issue 1-2, Sep. 2010, pp. 220-231.

Chapple "Combining Query Results with the UNION Command," ask.com. Computing Databases, downloaded from: http://databases.about.com/od/sql/a/union.htm (no date, printed on Oct. 14, 2013), 1 pp.

Fantozzi, A Strategic Approach to Supply Chain Event Management, student submission for Masters Degree, Massachusetts Institute of Technology, Jun. 2003, 36 pp .

Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011, 16 pp.

Pradhan, Implementing and Configuring SAP® Event Management, Galileo Press, 2010, pp. 17-21.

Wilson et al., SAP Event Management, an Overview, Q Data USA, Inc., 2009, 16 pp.

U.S. Appl. No. 12/548,281, Non-Final Office Action mailed on Feb. 13, 2014, 16 pages.

U.S. Appl. No. 13/177,748, Final Office Action mailed on Mar. 20, 2014, 23 pages.

(56) References Cited

OTHER PUBLICATIONS

International Search Report dated Apr. 3, 2014 for PCT/US2014/010832, 9 pages.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).
Call User Defined Functions from Pig, Amazon Elastic MapReduce, Mar. 2009, 2 pages.
U.S. Appl. No. 12/548,187, Final Office Action mailed on Jun. 4, 2014, 63 pages.
U.S. Appl. No. 13/089,556, Final Office Action mailed on Jun. 13, 2014, 13 pages.
U.S. Appl. No. 13/107,742, Non-Final Office Action mailed on Jun. 19, 2014, 20 pages.
Notice of Allowance for U.S. Appl. No. 13/089,556 dated Oct. 6, 2014, 9 pages.
U.S. Appl. No. 12/548,187, Advisory Action mailed on Sep. 26, 2014, 6 pages.
Non-Final Office Action for U.S. Appl. No. 12/913,636 dated Jul. 24, 2014, 21 pages.
Non-Final Office Action for U.S. Appl. No. 12/957,201 dated Jul. 30, 2014, 12 pages.
Non-Final Office Action for U.S. Appl. No. 13/770,969 dated Aug. 7, 2014, 9 pages.
Final Office Action for U.S. Appl. No. 12/548,281 dated Aug. 13, 2014, 19 pages.
International Application No. PCT/US2013/062047, International Search Report and Written Opinion mailed on Jul. 16, 2014, 12 pages.
International Application No. PCT/US2014/017061, International Search Report and Written Opinion mailed on Sep. 9, 2014, 12 pages.
Non-Final Office Action for U.S. Appl. No. 14/302,031 dated Aug. 27, 2014, 19 pages.
Non-Final Office Action for U.S. Appl. 13/764,560 dated Sep. 12, 2014, 23 pages.
Harish et al., "Identifying Robust Plans through Plan Diagram Reduction", PVLDB '08, Auckland, New Zealand, Aug. 23-28, 2008, pp. 1124-1140.
Stillger et al., "LEO- DB2's LEarning Optimizer", Proc. Of the VLDB, Roma, Italy, Sep. 2001, pp. 19-28.
Rao et al., "Compiled Query Execution Engine using JVM", ICDE '06, Atlanta, GA, Apr. 3-7, 2006, 12 pages.
Microsoft Computer Dictionary, 5th Edition, Microsoft Press, Redmond, WA, @ 2002, pp. 238-239 and 529.
"Bottom-up parsing", Wikipedia, downloaded from: http://en.wikipedia.org/wiki/Bottom-up_parsing on Sep. 8, 2014, pp. 1-2.
"Branch Predication", Wikipedia, downloaded from: http://en.wikipedia.org/wiki/Branch_predication on Sep. 8, 2014, pp. 1-4.
Dewson Beginning SQL Server 2008 for Developers: From Novice to Professional, A Press, Berkeley, CA, © 2008, pp. 337-349 and 418-438.
Shah et al., Flux: an adaptive partitioning operator for continuous query systems, Proceedings of the 19th International Conference on Data Engineering, Mar. 5-8, 2003, pp. 25-36.
Non-Final Office Action for U.S. Appl. No. 13/838,259, dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.

\* cited by examiner

FRAMEWORK FOR DYNAMICALLY GENERATING TUPLE AND PAGE CLASSES

CROSS-REFERENCES TO RELATED APPLICATIONS

The present application incorporates by reference for all purposes the entire contents of the following related applications:

(1) U.S. patent application Ser. No. 12/396,008 (now U.S. Pat. No. 8,145,859), filed Mar. 2, 2009, entitled "Method and System for Spilling From a Queue to a Persistent Store;" and (2) U.S. patent application Ser. No. 12/395,871, now U.S. Pat. No. 8,352,517, filed Mar. 2, 2009, entitled "Infrastructure for Spilling Pages to a Persistent Store."

BACKGROUND OF THE INVENTION

The present invention relates to managing a data stream, and more specifically to techniques for dynamically generating tuple and page classes.

In applications such as stock quote monitoring, automobile traffic monitoring, and data sensing, data is generated in the form of a stream of events over time. A data stream, also referred to as an event stream, is a real-time, continuous, sequence of events. Examples of sources that generate data streams include sensors and probes (e.g., radio frequency identification (RFID) sensors, temperature sensors, etc.) configured to send a sequence of sensor readings, financial tickers, network monitoring and traffic management applications sending network status, click stream analysis tools, and others. The term "events" are used interchangeably with "tuples." As used herein, tuples of a stream have the same set of attributes but not necessarily the same attribute values for those attributes. Each tuple is also associated with a particular time. A tuple may be considered to be logically similar to a single row or record in a relational database.

Processing the data streams is often referred to as "stream processing." The data streams may be processed to detect complex patterns, event correlations, relationships between events, etc. For example, a sensor placed at a particular section of a highway may output a data stream comprising information detected by the sensor about automobiles that pass the particular section. A data stream output by the sensor may include information such as the type of automobile, the speed of the automobile, the time that the automobile was on the particular section, and other like information. This data stream may then be processed to determine heavy traffic congestion conditions (indicated by slow average speeds of automobiles), and other traffic related conditions or patterns.

In traditional database systems data is stored in a database, for example in tables in a database. The data stored in a database represents a finite data set against which queries and other data manipulation operations may be performed using a data management language such as Structured Query Language (SQL). SQL and other traditional database management tools and algorithms are designed based upon the assumption that the tools and algorithms are executed against a potentially large, but finite, collection of data. Such traditional tools and algorithms are unable to handle data streams, as described above, due to the possibly continuous and unbounded nature of data received via the data streams monitored system. Further, storing the events data in a table is impractical due to the large amounts of data that is continually received and the fast frequency at which the data may be received. Due to the ever increasing number of applications that transmit data in the form of a data stream, the ability to process such data streams has become important.

BRIEF SUMMARY OF THE INVENTION

Embodiments of the present invention provide techniques for reducing the memory used for processing events received in a data stream. In one embodiment, this is achieved by reducing the memory required for storing tuples. In one embodiment, the data stream is comprised of a plurality of tuples as stored in a memory. Reducing the memory required for storing tuples improves the performance of an event processing system by enabling the system to handle a larger number of tuples. As a result, the processing system is capable of handling tuples received at a high input rate.

In one embodiment, techniques are provided for processing a data stream. A tuple is received and a tuple specification that defines a layout of the tuple is determined. The layout identifies one or more data types that are included in the tuple. A tuple class corresponding to the tuple specification is determined and generated dynamically during runtime of the processing system. A tuple object based on the tuple class is instantiated and stored in a memory.

In another embodiment of the present invention, a method for processing a data stream includes receiving a tuple and determining a tuple specification defining a layout of the tuple. The layout identifies one or more data types that are included in the tuple. A page class corresponding to the tuple specification is determined and generated dynamically during runtime of the processing system. A page object based on the page class is instantiated and stored in a memory.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide techniques for reducing the memory used for processing events received in a data stream. In one embodiment, this is achieved by reducing the memory required for storing tuples. In one embodiment, the data stream is comprised of a plurality of tuples as stored in a memory. Reducing the memory required for storing tuples improves the performance of an event processing system by enabling the system to handle a larger number of tuples. As a result, the processing system is capable of handling tuples received at a high input rate.

A data stream or event stream is a real-time, continuous, sequence of events. The stream thus represents sets of data. The elements in the data stream can be viewed as a series of events and accordingly the data stream is also referred to as an event stream. Events may include temperature readings from a sensor such as 10°, 15°, 20°, etc. Each event stream has two elements, the data itself, which are called events, and a timestamp. When an event stream is received by a computer system, such as an event processing server (EPS), the event stream is stored in a memory, such as random access memory (RAM), of the EPS as a sequence of <tuple, timestamp> pairs. The tuple refers to the data portion of the stream. An event stream can include multiple events and events are stored as memory objects, such as tuple objects. The timestamps associated with tuples define an order in which the tuples are received. Timestamps in the event stream reflect an application's notion of time. The timestamp is part of the schema of the event stream, and two or more tuples can have the same timestamp or different timestamps.

Figure 1:
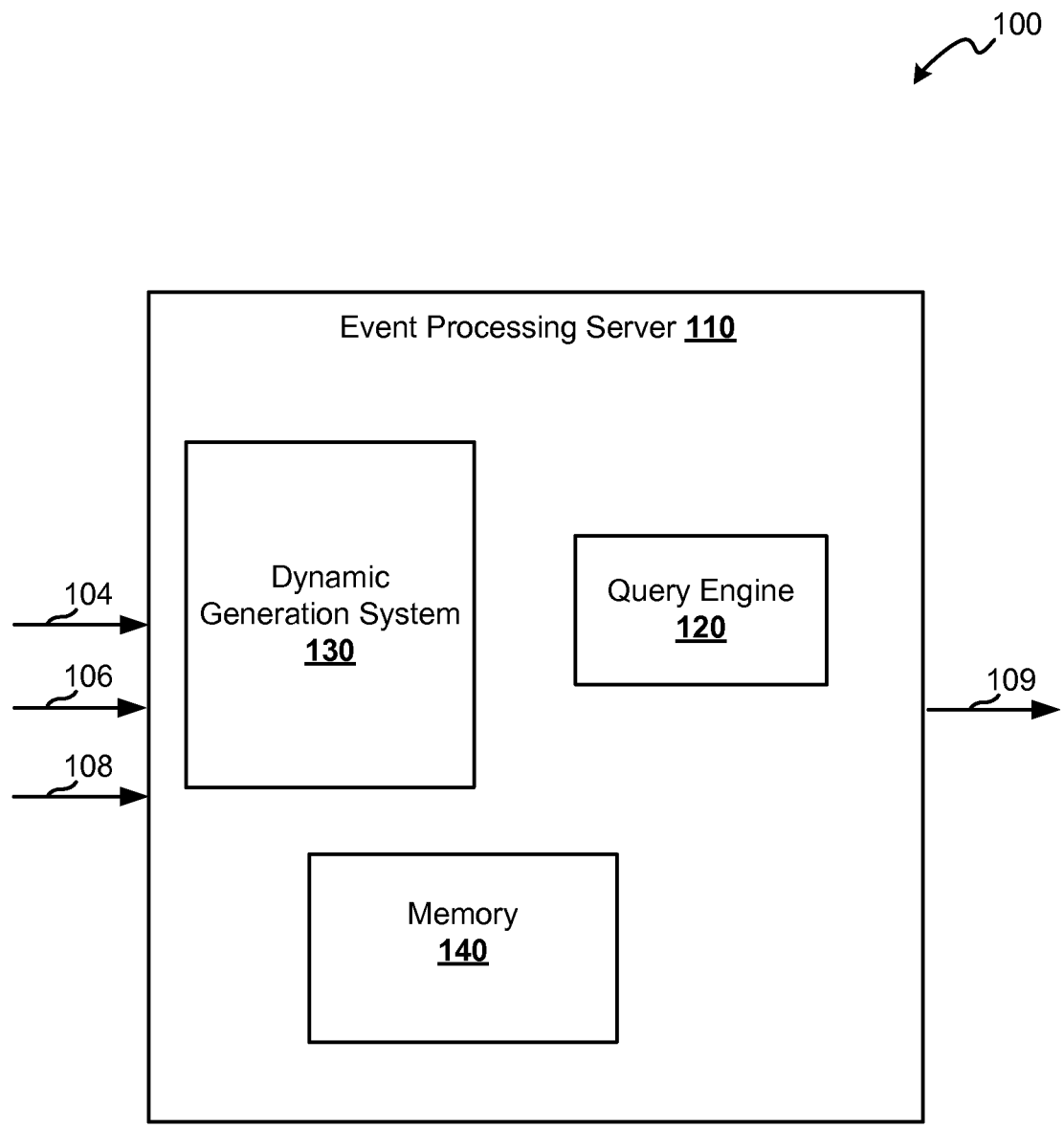
FIG. 1 is a simplified block diagram of a system that incorporates an embodiment of the present invention.

FIG. 1 is a simplified block diagram of a system 100 that incorporates an embodiment of the present invention. As depicted in FIG. 1, system 100 includes one or more event streams 104, 106, and 108 which are received by an events processing server (EPS) 110. Streams 104, 106, and 108 may be received from different sources including a database, a file, a messaging service, various applications, devices such as various types of sensors (e.g., RFID sensors, temperature sensors, etc.), tickers, etc. Each event stream comprises one or more events. The events in the stream are received by event processing server 110 in a sequence at specific time points. EPS 110 may receive streams 104, 106, and 108 via a push-based mechanism or a pull-based mechanism or other mechanisms.

Several different methods may be used in order to create bounds on an event stream data stream A set of events in the bounded data may be referred to herein as a "relation." In an embodiment, the time associated with the events in a data stream may be used to create bounds on the data. A time-based sliding window may be used to determine bounded sets of events received in the event stream. Events received within a time window are considered to define a set of events. For example, a sliding time window may be specified covering a span of time such as the last 10 minutes, last 8 seconds, etc. As used herein, a time-based sliding window is used to determine a data set that comprises the events received within the span of the time window. The window "slides" as new events are received into the relation and older, expired events are removed from the window once these events are no longer located within the specified time range. These bounded sets may store state data to process the continuous queries. Relational algebra may then be applied on top of the data within the window.

As depicted in FIG. 1, system 100 includes event processing server 110 that is configured to process an event stream. EPS 110 is configured to perform various types of processing on the incoming streams 104, 106, and 108 such as running continuous queries on the incoming event stream, etc. EPS 110 may generate an output stream of tuples 109 based upon the processing. For example, output stream 109 may be a stream of tuples resulting from a continuous query.

Event processing server 110 includes memory 140, a dynamic generation system 130, and a query execution system 120. In one embodiment, memory 140 is configured to store each received event as a sequence of <tuple, timestamp> pairs. Memory 140 may be random access memory ("RAM"). Memory 140 is shown as being contained within the EPS 110, but may be located elsewhere in other embodiments of the invention.

Dynamic generation system 130 is configured to optimize, in run-time, the tuples to occupy less space in memory 140. The optimized tuples may then be processed. Query engine 120 is configured to process the tuples, optimized or not, such as by running continuous queries on the incoming event stream, etc. Output data stream 109 resulting from the processing may be output by EPS 110.

By optimizing the tuples, the performance of event processing server is greatly enhanced. For example, with more available space in memory 140, EPS 110 is able to handle faster streams and/or larger window sizes.

Figure 2:
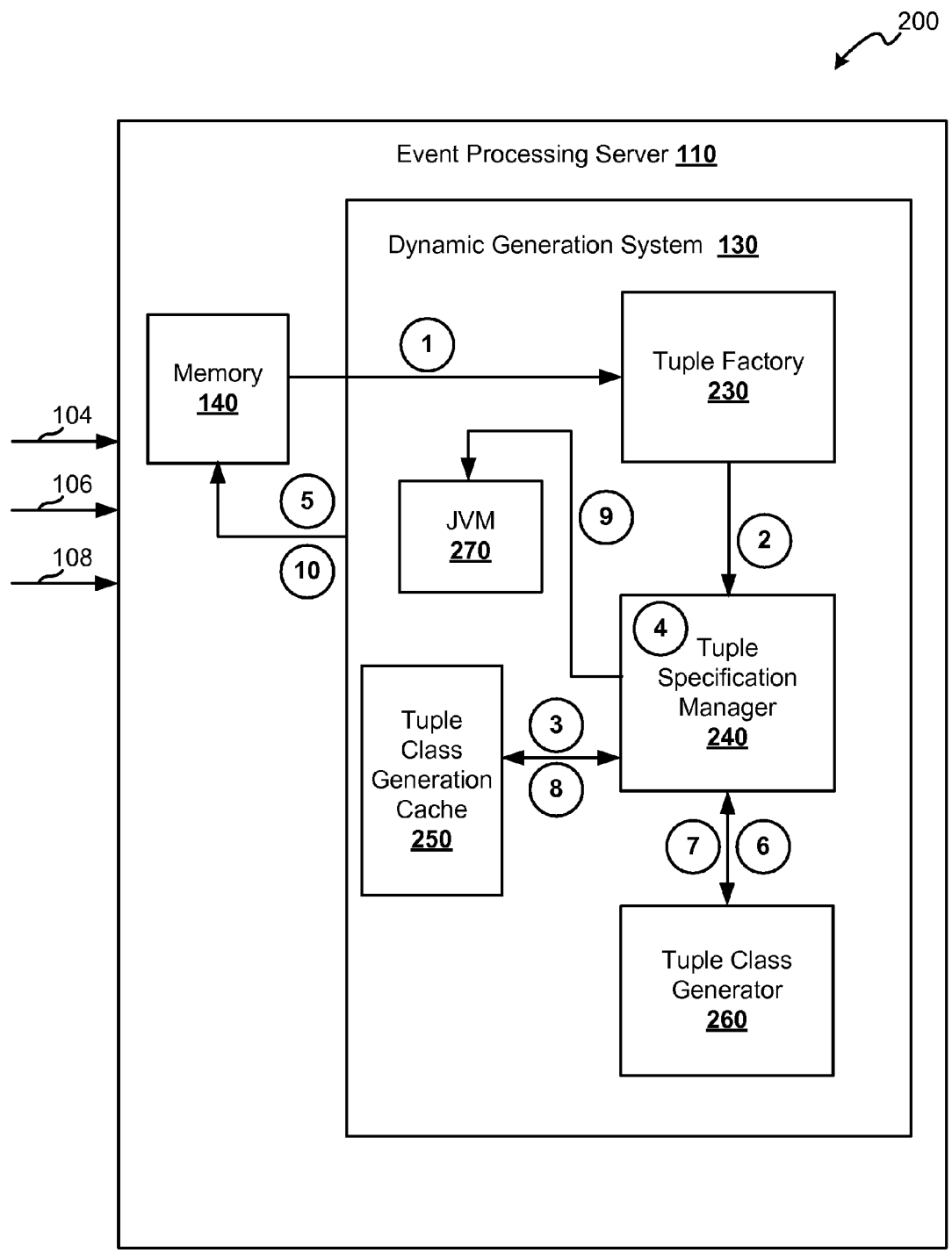
FIG. 2 a simplified block diagram of a dynamic generation system in accordance with embodiments of the present invention.

FIG. 2 a simplified block diagram of dynamic generation system 130 in accordance with embodiments of the present invention. As depicted in FIG. 2, event processing server 110 is configured to receive event streams 104, 106, 108. Event processing server 110 is comprised of memory 140 and a dynamic generation system 130. The components depicted in FIG. 2 may be performed by software (e.g., code, instructions, program) executed by a processor, hardware, or combinations thereof.

Memory 140 is configured to store the events of the event stream as a sequence of <tuple, timestamp> pairs. The layout of each stream is configurable and thus the specific layout of any tuple cannot be pre-determined. The event stream is configurable during creation of the event stream, for example by a user. The tuple class definition in continuous query language (CQL) is static and is configured to support all possible data types since it is not possible to know which data types will actually be used when the stream is created. Before optimization is performed, the tuple data structures are all based on the static tuple class definition. The tuple data structure is not optimized to occupy a smaller amount of space in memory 140, and as such, occupies excessive space.

In one embodiment of the present invention, dynamic generation system 130 is configured to optimize a tuple. Dynamic generation system 130 is comprised of tuple factory 230, tuple specification manager 240, tuple class generation cache 250, tuple class generator, and java virtual machine (JVM) 270.

At step 1, as shown, as a tuple state is stored in memory 140, a create tuple instruction is allocated to tuple factory 230. Tuple factory 230 is configured to invoke a tuple object at step 2 to manager 240. Manager 240 is configured to facilitate the creation of the tuple class. Manager 240 references a tuple specification which was created using a data definition language (DLL), when the stream was created. In other words, the tuple specification is determined from a stream creation statement. The tuple specification dictates the attributes of the tuple. A tuple may be considered to be logically similar to a single row or record in a relational database. The tuple specification, for example, may dictate that the tuple includes an integer in a first column and a float in a second column.

In order for manager 240 to facilitate the creation of a dynamic tuple class, it is determined whether a dynamic class has already been generated, and if not, a class is generated dynamically. For example, a dynamic class (i.e., a class that is generated dynamically) may have previously been generated for a tuple having an integer in the first column followed by a float in a second column. Rather than creating yet another copy of the same class for each tuple, a previously created dynamic class that matches the tuple specification of the current tuple is used.

At step 3, manager 240 queries tuple class generation cache 250. Tuple class generation cache 250 is configured to determine whether a dynamic tuple class has been previously generated for the tuple specification corresponding to the current tuple. If a corresponding dynamic tuple class has indeed been previously generated, that dynamic class is returned to manager 240.

At step 4, manager 240 receives the dynamic class from class generation cache 250. Tuple factory 230 is configured to create an object for storing the tuple using the dynamic tuple class received from cache 250 for the current tuple specification. The dynamic class has previously been loaded to the JVM. At step 5, the tuple object that is instantiated using the dynamic tuple class is stored in memory 140. A dynamic tuple object is a tuple object that is instantiated using a dynamic tuple class. Once stored, the dynamic tuple object is available for processing, such as preprocessing performed by query engine 120.

If it is determined that cache 250 does not comprise a previously created tuple class corresponding to the layout of the present tuple specification, at step 6, manager 240 requests a tuple class to be generated dynamically by tuple class generator 260 corresponding to the layout of the present tuple specification.

Tuple class generator 260 is configured to dynamically generate tuple classes for tuple specifications received from manager 240. In one embodiment, this is done by using byte code manipulation libraries. For example, a tuple specification for the current tuple may specify an integer in a first column followed by a long in a second column. Generator 260 dynamically creates a corresponding tuple class to suit the specification, omitting support for extraneous data types.

At step 7, generator 260 returns the dynamically created tuple class to the manager 240. At step 8, manager 240 may request that the dynamic class be stored in cache 250 for possible use by subsequent tuples. At step 9, manger 240 loads the dynamic tuple class into JVM 270. In one embodiment, a dynamic tuple class is used to instantiate tuple objects which occupy less space in memory. This may be done using byte code manipulation for a java virtual machine (JVM). JVM allows for dynamic (i.e., runtime) class loading such that an application hosted by the JVM can leverage types that were previously unknown or non-existent during compile time. Byte code manipulation libraries may be used to generate a dynamic tuple class before loading the class to JVM. Notwithstanding the fact that the layout of any tuple cannot be determined before the application is compiled, byte code manipulation allows a dynamic tuple class to be generated on the fly and incorporated into a running JVM.

After loading the dynamic tuple class into JVM 270, tuple factory 230 instantiates a dynamic tuple object using the dynamically created class. At step 10, the dynamic tuple object is stored in memory 140. Once stored, the dynamic tuple object may be accessed and processed by a query engine.

Figure 3:
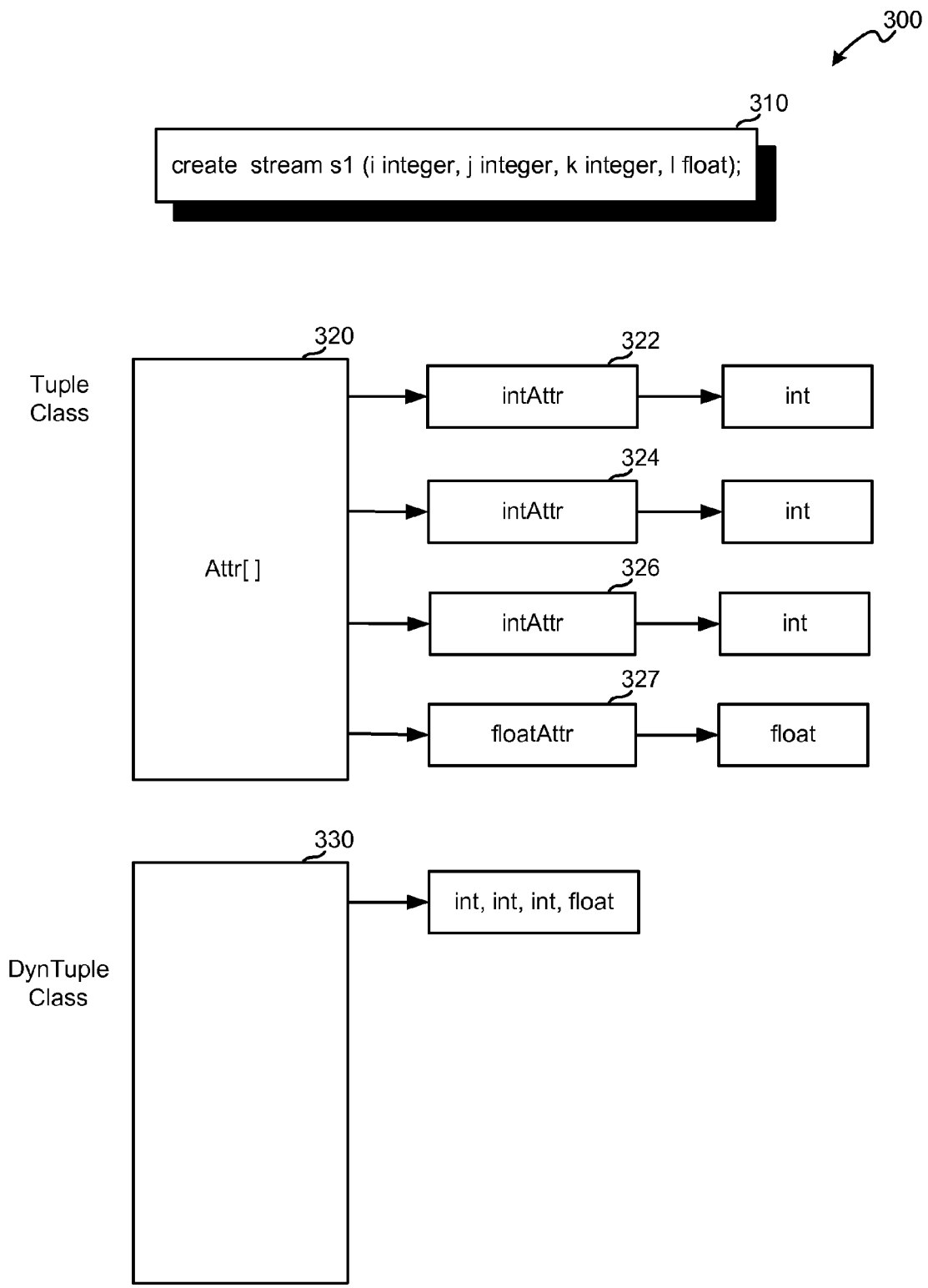
FIG. 3 is a simplified block diagram which illustrates a dynamic tuple class with minimized memory consumption.

FIG. 3 is a simplified block diagram of a dynamic tuple class with minimized memory consumption according to an embodiment of the present invention. Since the layout of each stream is configurable, for example by users, the layout of any tuple cannot be pre-determined and all possible data types in the stream layout are supported. For example, when event stream s1, as created by statement 310, is fed into the event processing server, each event is stored in the memory of the event processing server as a tuple having an abstract base class which is extended by various subclasses to support the different data types within a tuple. In Java, a typical implementation of tuples is to define an abstract base class AttrValue which is then extended by various subclasses supporting different data types, such as intAttr to support an integer data type, a longAttr to support a long data type, a floatAttr to support a float data type, a doubleAttr to support a double data type, and so on. For example, based on stream creation statement 310, each tuple in stream s1 consists of a tuple class 320 comprising one intAttr subclass 322, one intAttr subclass 324, one intAttr subclass 326, and one float subclass 327. Each of subclasses 322, 324, 326, and 327 extends a base class AttrValue 328. Subclass 322 supports the integer i of the stream s1, subclass 324 supports the integers of the stream s1, subclass 326 supports the integer k of the stream s1, subclass 327 supports the float l of the stream s1 as specified in statement 310.

Prior to optimization and once instantiated, a tuple object includes: four base objects, three integer objects and one float object. The total memory consumption of a tuple object in the event stream created by statement 310 is 96 bytes: one array object overhead at 16 bytes per object, 4 base object overheads at 16 bytes per object, three integer objects at 3*(sizeof (int)) per object, and one float object at 1*(sizeof (float)) per object.

A dynamic tuple class 330 may be generated, for example by dynamic generation system 130 depicted in FIG. 1 and FIG. 2 of event processing server 110. For example, dynamic tuple class 330 may be created dynamically after the tuple layout is known to the event processing server during runtime in a manner that optimizes the memory needed for storing the tuple. As previously mentioned, the layout of the tuple is determined by a stream creation statement. Using this layout, techniques as described herein are used to generate dynamic tuple class 330 which has been optimized based upon the tuple layout. A dynamic tuple object, which is instantiated from dynamic tuple class 330, includes: three integer primitives and one float primitive. The total memory consumption of the dynamic tuple object in the event stream created by statement 310 is 16 bytes: three integer primitives at 4*(sizeof (int)) per object, and one float primitive at 1*(sizeof (float)) per object.

For the above example, the memory consumption is reduced from 96 bytes to 16 bytes. Accordingly, by dynamically creating a tuple object based upon a class that is dynamically determined after determining a layout of the tuple, a memory savings of 6 fold are obtained for the example described above. The is due to the tuple class being tailored to support only those data types that are actually included in the tuple.

Figure 4:
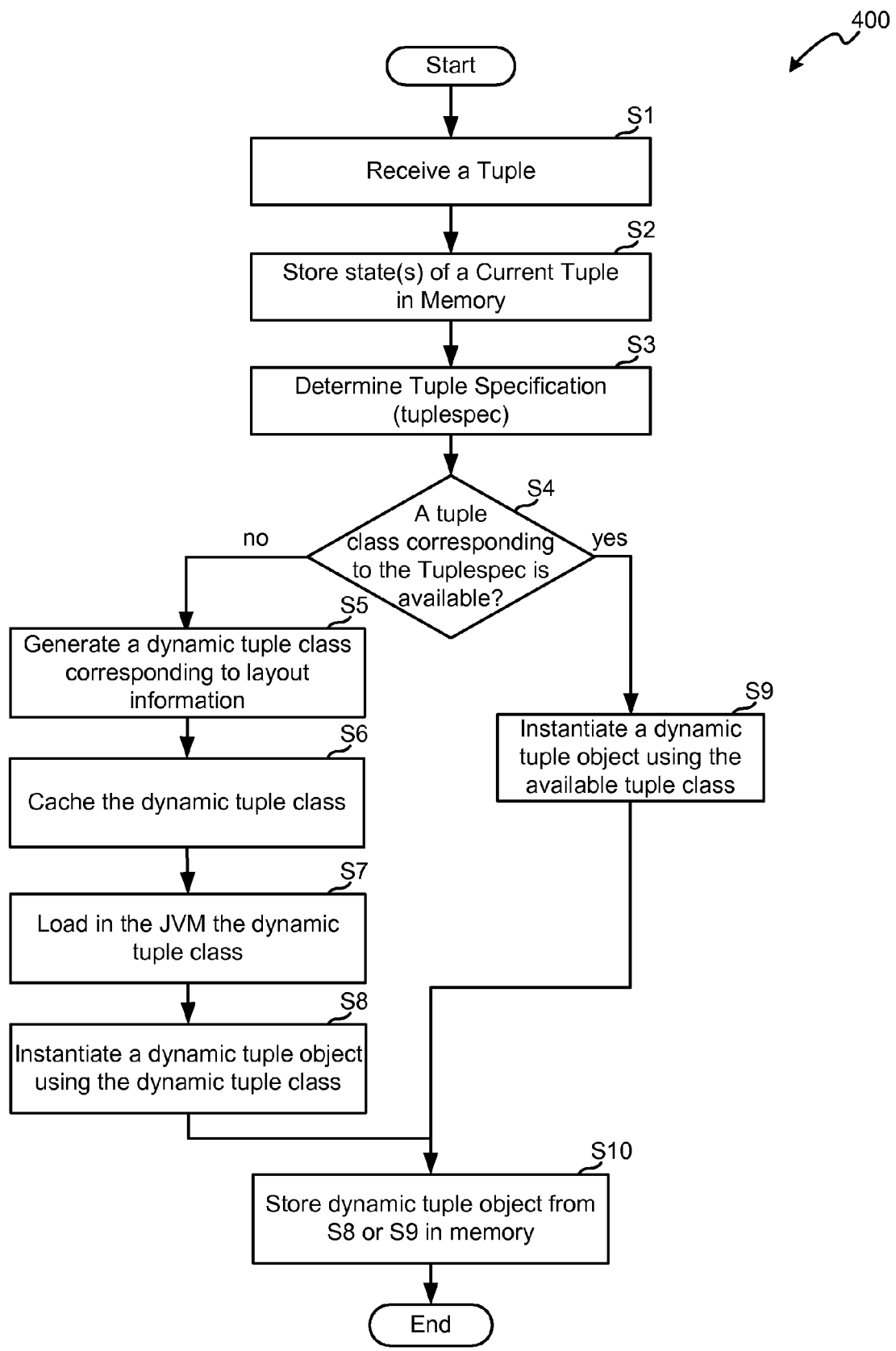
FIG. 4 depicts a simplified method for dynamically generating a tuple class and generating a tuple object according to an embodiment of the present invention.

FIG. 4 depicts a simplified method 400 for dynamically generating a tuple class and generating a tuple object according to an embodiment of the present invention. The processing depicted in FIG. 4 may be performed by software (e.g., code, instructions, program) executed by a processor, hardware, or combinations thereof.

In one embodiment, at step S1, the method includes receiving a tuple, for example, in an event stream. At step S2, state(s) of a current tuple are stored in memory. In one embodiment, tuples are stored as states. As used herein, states of a tuple include the underlying data structures associated with the tuple. In one embodiment of the present invention, the data structures include a store, a synopsis, and a queue. At step S3, a tuple specification is determined. A tuple specification includes information about the layout of each tuple in the stream. An event stream can be created, for example by users of the event processing server, to have a defined layout or relation. For example, a layout of a stream may include an integer and a float, and the tuple specification that the tuple layout includes an integer and a float.

At step S4, it is determined whether a tuple class corresponding to the tuple specification determined at step S3 is available. In one embodiment, as described above, this may be done by checking if such a class exists in a cache configured to store the tuple classes. A tuple class may be available because it was previously created, for example for a previously received tuple for a data stream. For example, if the tuple specification from step S3 indicates a layout having an integer and a float, it is determined whether a previously generated tuple class has been generated specifying an integer and a float.

In the case that a tuple class corresponding to the tuple specification is not available, a tuple class is dynamically created at step S5. For example, if the layout information indicates a layout having an integer and a float, a tuple class is dynamically generated for the same layout, i.e., also having an integer and a float. The dynamically generated tuple class may be cached at step S6, for example, for use by subsequent tuples that have the same or similar layout. At step S7, the tuple class dynamically generated at step S5 is loaded into a Java Virtual Machine (JVM). As previously described, JVM allows for dynamic (i.e., runtime) class loading such that an application hosted by the JVM can leverage types that were previously unknown or non-existent during compile time. At step S8, after loading the dynamically created tuple class into the JVM, a dynamic tuple object may be instantiated based upon the dynamically created class. The loaded tuple class is also available for creating additional instances of the tuple class. Thus, new tuple objects based on the new classes can be generated on the fly and incorporated into the running JVM.

If it is determined in S4 that a tuple class is available corresponding to the tuple specification, processing proceeds to step S9 where a tuple object is instantiated based upon the available tuple class.

Finally, at step S10, the dynamic tuple object instantiated at either step S8 or S9 is stored in the memory. Once stored, the dynamic tuple object may be accessed and processed by a query engine, such as query engine 120.

Pages

In one embodiment of the present invention, tuples may be grouped in a page. A page is a structure for storing a collection of tuples. A page may be implemented as an array of tuples or other similar construct. In another embodiment of the present invention, a page may include an individual array for every attribute of an object. For example, as previously described, a tuple may be considered to be logically similar to a single row or record in a relational database and the attributes of the tuple are represented by columns. As such, a page may include an array for every column (i.e., attribute) of the tuple. For example, column 1 might represent an integer, column 2 might represent a float, etc. Each column may be implemented as an individual array, such that array_integer is an array with integer values of multiple tuples and array_float is an array with float values of multiple tuples, for example. The page construct makes manipulation of tuples, including storage and removal of tuples, more efficient. Storage by page, as opposed to storage by individual tuples, decreases overhead by minimizing the disk access.

The use of pages presents a similar problem to the use of tuples, namely, that the data structures stored in memory 140 occupy an excessive amount of space. This is due to the configurable nature of stream layouts. As such the layouts of tuples and pages cannot be pre-determined. In other words, a page class definition in CQL is static and is configured to support all possible data types since it is not possible to know which data types will actually be used when the stream is created. Before optimization is performed, the page data structures are all instances of the static page class definition. The page data structure is not optimized to occupy a smaller amount of space in memory 140, and as such, occupies excessive space. For example, when less than all of the supported data types are actually used in the stream, space is wasted by the unused data types.

Figure 5:
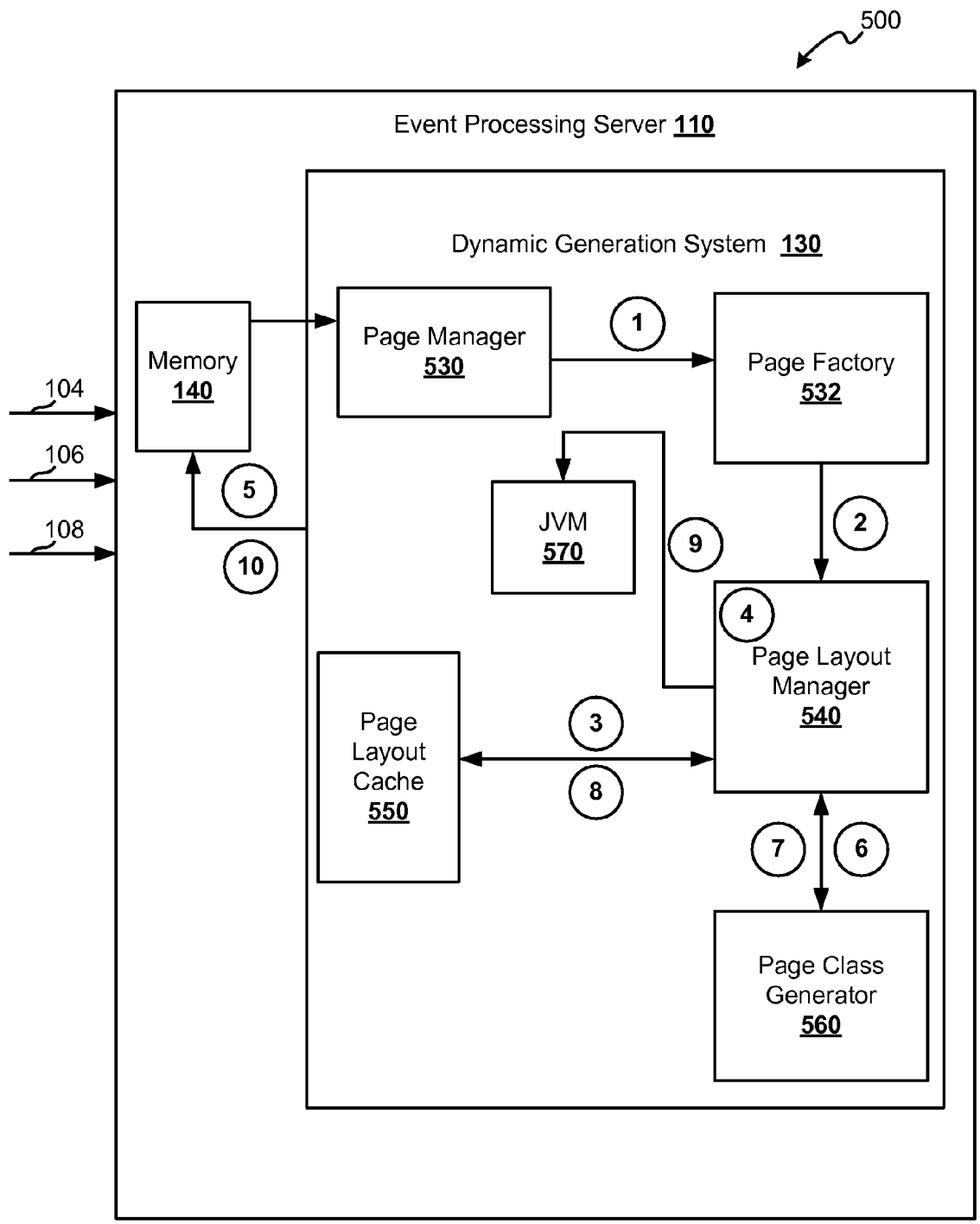
FIG. 5 is a simplified block diagram of a system for the dynamic generation of a page class in accordance with embodiments of the present invention.

FIG. 5 is a simplified block diagram of a system 500 for the dynamic generation of a page class in accordance with embodiments of the present invention. As depicted in FIG. 5, event processing server 110 is configured to receive event streams 104, 106, 108. Event processing server 110 is comprised of memory 140 and dynamic generation system 130. The components depicted in FIG. 5 may be performed by software (e.g., code, instructions, program) executed by a processor, hardware, or combinations thereof.

Memory 140 is configured to store the events of the event stream as a sequence of <tuple, timestamp> pairs. In another embodiment of the present invention, tuples may be grouped in a page and stored in memory 140. A page data structure is not optimized to occupy a smaller amount of space in memory 140, and as such, occupies excessive space.

In one embodiment of the present invention, dynamic generation system 130 is configured to optimize a page. In one embodiment, a page is created using the dynamically created page class. This dynamic page may occupy less space in memory. Dynamic generation system 130 is comprised of a page manager 530, a page factory 532, page layout manager 540, page layout cache 550, page class generator 560, and java virtual machine (JVM) 570.

At step 1, as shown, a create page instruction is allocated to page factory 532. Page factory is configured to invoke a page object at step 2 to page layout manager 540. Manager 540 is configured to facilitate the creation of a page class. Manager 540 references a tuple specification which was created using a data definition language DLL, such as CQL, when the stream was created. The tuple specification dictates the layout of the tuple. The layout may include various attributes of the tuple.

In order for the manager 540 to facilitate the creation of a dynamic page, it is determined whether a dynamic class has already been generated, and if not, a class is generated. For example, a dynamic page class (i.e., a class that is created using the dynamically generated page class) may have previously been generated for a page with tuples having a particular layout. Rather than creating yet another copy of the same class, a previously created dynamic class that matches the tuple specification of the current page is used.

At step 3, manager 540 queries dynamic page layout cache 550. Dynamic layout page cache 550 is configured to determine whether a dynamic page class has been previously generated for the tuple specification which corresponds with the current page. If a corresponding dynamic page class has indeed been previously generated, the dynamic class is returned to manager 540.

At step 4, manager 540 receives the dynamic page class from page layout cache 550. Page factory 532 is configured to create an object for storing the page using the dynamic page class. The dynamic page class has been previously loaded to the JVM. At step 5, the dynamic page object is stored in memory 140. Once stored, the dynamic page object may be accessed and processed by query engine 120. In one embodiment, a page class may have different types of tuples. In order to simplify the implementation, the page class may include only one type of tuple.

If it is determined that cache 550 does not comprise a previously created class corresponding to the layout of the present page, at step 6, manager 540 requests a page class to be generated dynamically by page class generator 560 corresponding to the layout of the present page.

Page class generator 560 is configured to dynamically generate page classes for tuple specifications received from manager 540. In one embodiment, this is done by using byte code manipulation libraries. For example, a tuple specification for the current page may require an integer in a first column and a long in a second column for each tuple within the page. Generator 560 creates a corresponding dynamic page class to suit the specification, omitting support for extraneous data types.

At step 7, generator 560 returns the dynamic page class to the manager 540. At step 8, the manager 540 requests that the dynamic page be stored in cache 550 for possible use by subsequent pages. At step 9, Manger 540 loads the dynamic page class into JVM 570. In one embodiment of the present invention, the dynamic page may be generated using byte code manipulation for a java virtual machine (JVM). As previously described, JVM allows for dynamic (i.e., runtime) class loading such that an application hosted by the JVM can leverage types that were previously unknown or non-existent during compile time. Byte code manipulation libraries may be used to generate a dynamic page class before loading the class to JVM. Notwithstanding the fact that the layout of any page cannot be determined before the application is compiled, byte code manipulation allows dynamic pages to be generated on the fly and incorporated into a running JVM.

After loading the dynamic page class into JVM 270, page factory 532 instantiates the dynamic page object using the dynamically created class. At step 10, the dynamic page is stored in memory 140. Once stored, the dynamic page may be accessed and processed by a query engine.

Figure 6:
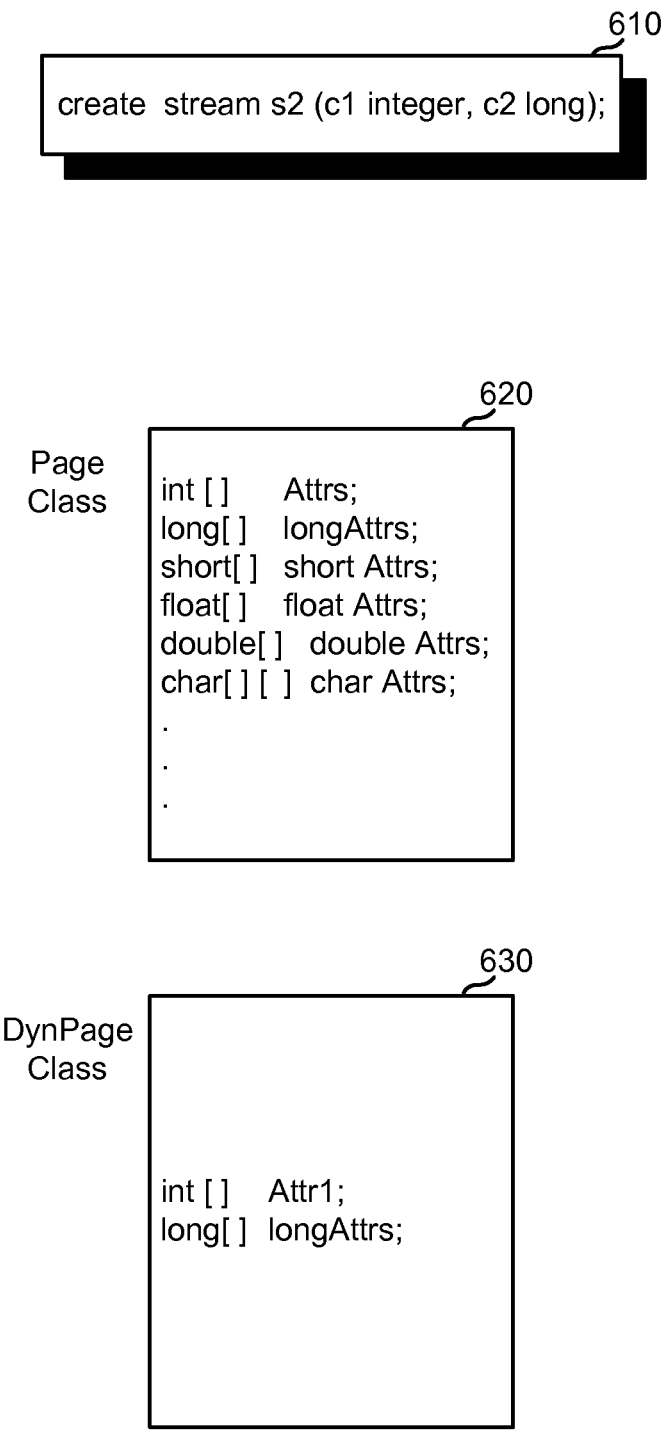
FIG. 6 is a simplified block diagram which illustrates a dynamic page object with minimized memory consumption.

FIG. 6 is a simplified block diagram which illustrates a dynamic page object with minimized memory consumption. Since the layout of each stream is configurable for example by users, the layout of a page cannot be pre-determined and all possible data types in the stream layout are supported. As shown, stream creation statement 610 defines the layout of stream s2 with an integer and a long data type. When the event stream s2 is fed into the event processing server 110, events may be group in a page. A page is a collection of tuples. As shown, page class 620 is implemented as individual arrays for every attribute of a tuple. As previously described, the tuple specification dictates the attributes of the tuple. A tuple may be considered to be logically similar to a single row or record in a relational database. The tuple specification, for example, may specify that the tuple includes an integer, a long, a short, a float, etc. Prior to optimization, memory 140 includes page class 620 which supports all possible data types that may be used, although every data type is not shown in FIG. 6. If data types are not used, the array representing the unused data type is set to NULL, thereby unnecessarily occupying space in memory.

The total memory consumption of a page of the event stream based on statement 610 is: Assuming ten data types are supported, 160 bytes are required to accommodate all of the data types, 10*sizeof(array object), where each data type array contains the page size of 100 primitives, which occupies 100*sumof(sizeof(primitive)) bytes. In total, 7360 bytes are occupied in memory by each page resulting from statement 610.

A dynamic page 630 may be generated, for example by dynamic generation system 130 depicted in FIG. 1 and FIG. 2 of event processing server 110. For example, dynamic page class 630 may be created dynamically when the tuple layout is known to the event processing server during runtime in a manner that optimizes the memory needed for storing the page. As previously mentioned, the layout of the tuple is determined by a stream creation statement.

Using this layout, techniques as described herein are used to generate dynamic page 630 which has been optimized based upon the tuple layout. A dynamic page object, which has been instantiated from dynamic page class 630, includes an array object for each data type that is actually specified in the stream creation statement 610. After optimization, for the embodiment as shown, the total memory consumption of the dynamic page 630 includes one Java object with one integer type array and one long type array. The total memory consumption of the dynamic page object based on statement 610 is: object overhead for two array objects, which in Java is 16 bytes, 100*4 bytes are required to accommodate the integer array and 100*8 bytes are required to accommodate the long type. In total, 1232 bytes are occupied in memory by dynamic page 630.

For the above example, the memory consumption is reduced from 7360 bytes to 1232 bytes. Accordingly, by dynamically creating a page object based upon a page class that is dynamically determined after determining a layout of the tuple, a memory savings of 5.9 fold are obtained for the example described above. The is due to the dynamic page class being tailored to support only those data types that are actually included in the tuple specification.

Figure 7:
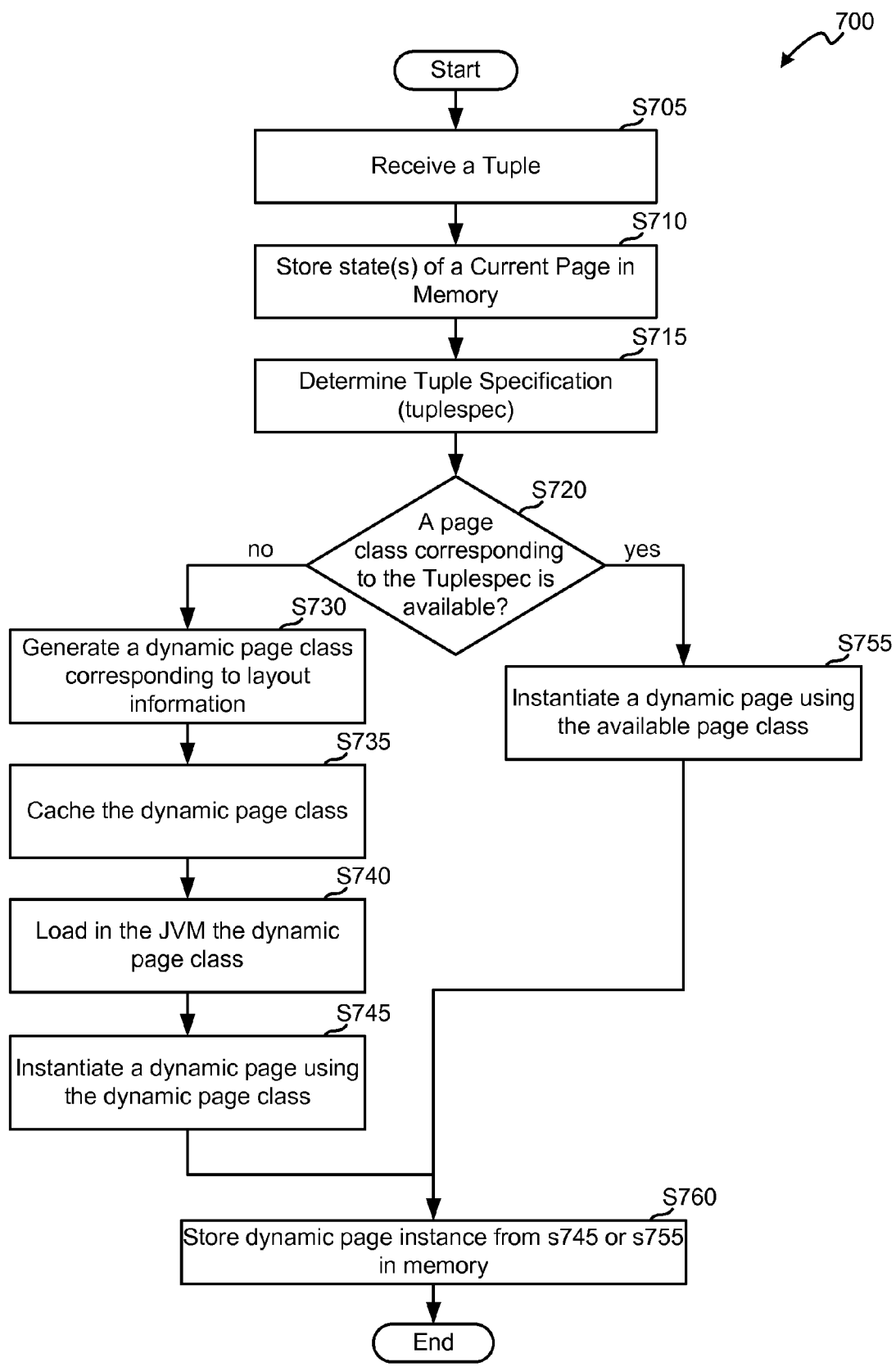
FIG. 7 depicts a simplified method for dynamically generating a page class and generating a page object according to an embodiment of the present invention.

FIG. 7 depicts a simplified method 700 for dynamically generating a page class and generating a page object according to an embodiment of the present invention. The processing depicted in FIG. 7 may be performed by software (e.g., code, instructions, program) executed by a processor, hardware, or combinations thereof.

In one embodiment, at step S705, the method includes receiving a tuple, for example, in an event stream. At step S710, state(s) of a current page are stored in memory 140. In one embodiment, a page is a collection of tuples, and state(s) of the collection of tuples are stored in memory 140. At step S715, a tuple specification is determined. A tuple specification includes information about the layout of the tuples in the stream. For example, a layout of a stream may include an integer and a float.

At step S720, it is determined whether a page class that corresponds to the tuple specification determined at step S715 is available. In one embodiment, this may be done by checking if such a class exists in a cache configured to store the page classes. A page class may be available because it was previously created, for example for a previously received tuple for a data stream. For example, if the tuple specification from step S715 indicates a layout having an integer and a float, it is determined whether a previously generated dynamic page class has been generated for a page with tuples having the same layout, i.e., also having an integer and a float.

In the case that a dynamic page class corresponding to the tuple specification is not available, a page class is dynamically created at step S730. For example, if the layout information indicates a layout having an integer and a float, a dynamic page class is generated with the same layout, i.e., also having tuples with an integer and a float. Where the page is set up as an array for each column or data type, the dynamic page class may include an array for the integer values of multiple tuples and an array for the float values of the multiple tuples. In one embodiment of the present invention, page class generation is performed in the following order: generate constructor, generate member fields for all data types used in the tuple specification, and generate access methods for all data types used in the tuple specification.

The dynamic page class may be cached at step S735, for example, for use by subsequent pages with tuples that have the same. At step S740, the dynamic page class generated at step S730 is loaded into a Java Virtual Machine (JVM). As previously described, JVM allows for dynamic (i.e., runtime) class loading such that an application hosted by the JVM can leverage types that were previously unknown or non-existent during compile time. After loading the dynamic page class at step S740, pages can be instantiated using the new class at step S745. Thus, new pages based on the new classes can be generated on the fly and incorporated into the running JVM.

If it is determined in S720 that a page class is available corresponding to the tuple specification, processing proceeds to step S755, where a page is instantiated using the returned dynamic page class.

Finally, at step S760, the dynamic page object generated at either step S745 or S755 is stored in memory 140. Once stored, the dynamic page object may be accessed and processed by query engine 120.

Figure 8:
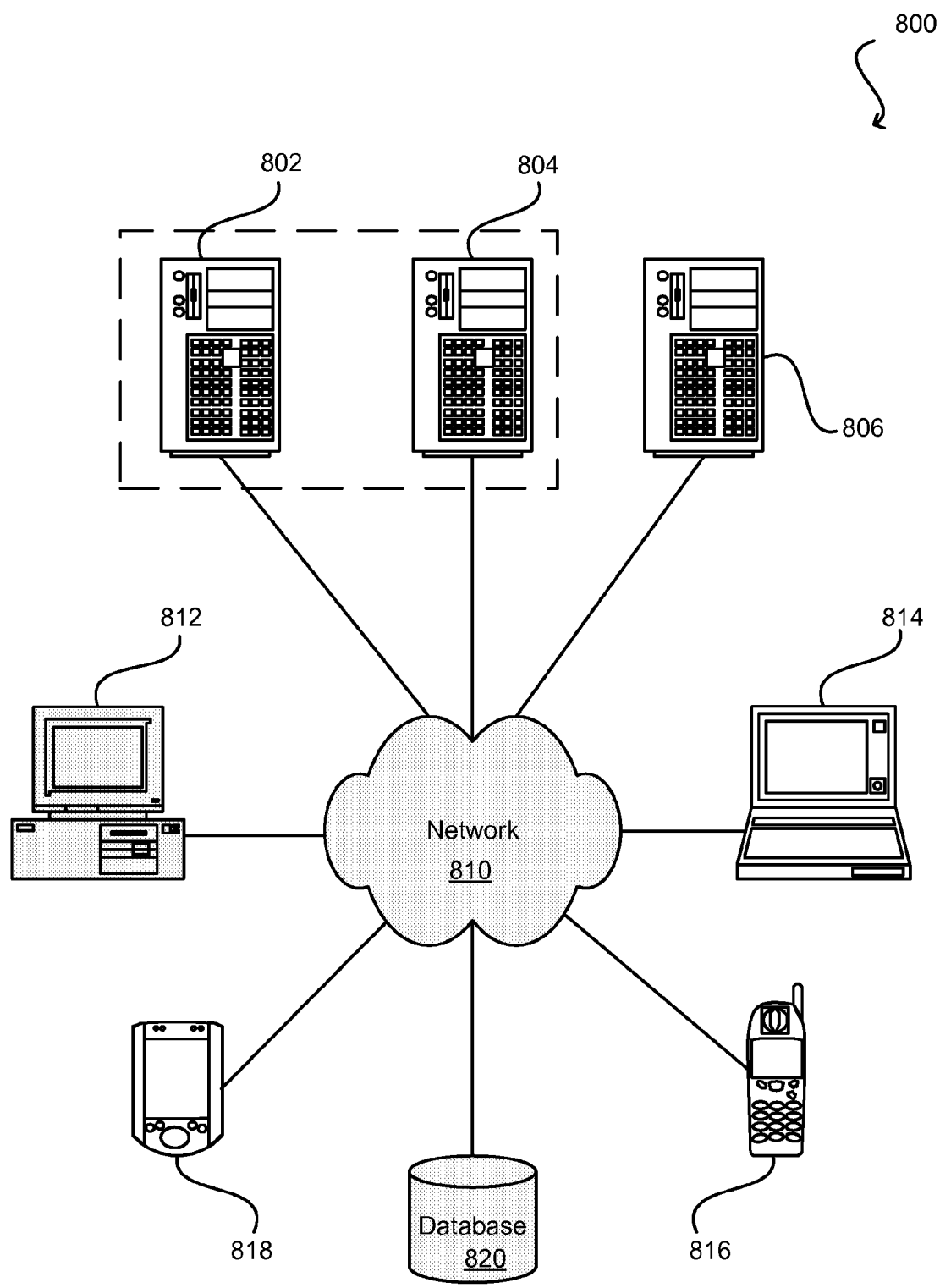
FIG. 8 is a block diagram illustrating components of a operating environment in which various embodiments of the present invention may be implemented.

FIG. 8 is a block diagram illustrating components of an operating environment in which various embodiments of the present invention may be implemented. The system 800 can include one or more user computers, computing devices, or processing devices 812, 814, 816, 818, which can be used to operate a client, such as a dedicated application, web browser, etc. The user computers 812, 814, 816, 818 can be general purpose personal computers (including, merely by way of example, personal computers and/or laptop computers running various versions of MICROSOFT WINDOWS™ and/or APPLE MACINTOSH™ operating systems), cell phones or personal digital assistants (PDAs) (running software such as MICROSOFT WINDOWS MOBILE™ and being Internet, e-mail, Short Message Service (SMS), Blackberry, or other communication protocol enabled), and/or workstation computers running any of a variety of commercially-available UNIX or UNIX-like operating systems (including without limitation, the variety of GNU/Linux operating systems). These user computers 812, 814, 816, 818 may also have any of a variety of applications, including one or more development systems, database client and/or server applications, and Web browser applications. Alternatively, the user computers 812, 814, 816, 818 may be any other electronic device, such as a thin-client computer, Internet-enabled gaming system, and/or personal messaging device, capable of communicating via a network (e.g., the network 810 described below) and/or displaying and navigating Web pages or other types of electronic documents. Although the system 800 is shown with four user computers, any number of user computers may be supported.

In most embodiments, the system 800 includes some type of network 810. The network may can be any type of network familiar to those skilled in the art that can support data communications using any of a variety of commercially-available protocols, including without limitation TCP/IP, SNA, IPX, AppleTalk, and the like. Merely by way of example, the network 810 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 802, 804, 806 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 806) may be dedicated to running applications, such as a business application, a Web server, application server, etc. Such servers may be used to process requests from user computers 812, 814, 816, 818. The applications can also include any number of applications for controlling access to resources of the servers 802, 804, 806.

The Web server can be running an operating system including any of those discussed above, as well as any commercially-available server operating systems. The Web server can also run any of a variety of server applications and/or mid-tier applications, including Hypertext Transfer Protocol (HTTP) servers, File Transfer Protocol (FTP) servers, Common Gateway Interface (CGI) servers, database servers, Java servers, business applications, and the like. The server(s) also may be one or more computers which can be capable of executing programs or scripts in response to the user computers 812, 814, 816, 818. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from ORACLE™, MICROSOFT™, SYBASE™, IBM™ and the like, which can process requests from database clients running on a user computer 812, 814, 816, 818.

The system 800 may also include one or more databases 820. The database(s) 820 may reside in a variety of locations. By way of example, a database 820 may reside on a storage medium local to (and/or resident in) one or more of the computers 802, 804, 806, 812, 814, 816, 818. Alternatively, it may be remote from any or all of the computers 802, 804, 806, 812, 814, 816, 818, and/or in communication (e.g., via the network 810) with one or more of these. In a particular set of embodiments, the database 820 may reside in a storage-area network ("SAN") familiar to those skilled in the art. Similarly, any necessary files for performing the functions attributed to the computers 802, 804, 806, 812, 814, 816, 818 may be stored locally on the respective computer and/or remotely, as appropriate. In one set of embodiments, the database 820 may be a relational database, such as Oracle 10g, that is adapted to store, update, and retrieve data in response to SQL-formatted commands.

Figure 9:
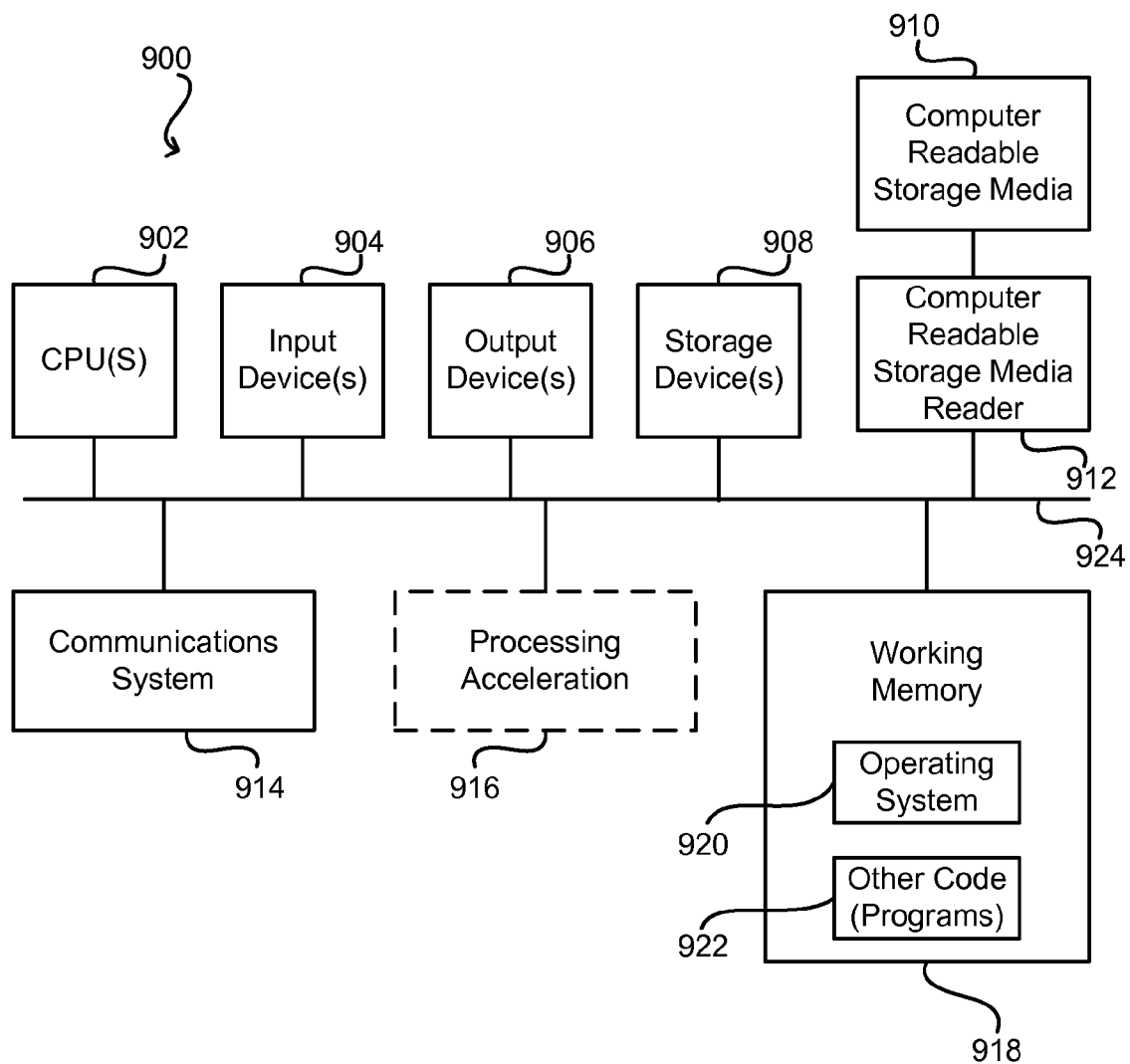
FIG. 9 illustrates a computer system in which various embodiments of the present invention may be implemented.

FIG. 9 illustrates a computer system 900, in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A method performed by a processing system for processing a data stream comprising events, the method comprising:
   receiving a tuple;
   determining a tuple specification defining a layout of the tuple, wherein the layout identifies one or more data types included in the tuple;
   determining a tuple class corresponding to the tuple specification based on the layout;
   instantiating, based on the particular tuple class, a tuple object that includes an array for at least one of the one or more data types identified in the tuple specification; and
   storing the tuple object in a memory;
   wherein the tuple object has a structure including a particular object which includes an array for each of the one or more data types identified in the tuple specification.

2. The method of claim 1, wherein the tuple specification is determined during creation of the data stream in response to a stream creation statement that is issued by a user of the processing system and that indicates the tuple specification; and wherein determining the tuple class corresponding to the tuple specification comprises locating, in a cache that contains tuple classes that were dynamically generated during the runtime of the processing system, a particular tuple class whose members have data types that are identical to the one or more data types identified by the layout.

3. The method of claim 1, further comprising:
   generating the particular tuple class to correspond with the tuple specification; and
   loading, using byte code manipulation libraries, the particular tuple class to a Virtual Machine during runtime of the processing system and prior to instantiating the tuple object.

4. The method of claim 1, wherein a memory requirement of the tuple object is less than a memory requirement of a static tuple object that is defined by the processing system; wherein the static tuple object is based on a tuple class that is generated statically within the processing system and that supports all data types including data types not identified by the layout; and wherein the particular tuple class supports only the one or more data types identified by the layout.

5. A method performed by a processing system for processing a data stream comprising events, the method comprising:
   receiving a tuple;
   determining a tuple specification defining a layout of the tuple, wherein the layout identifies one or more data types included in the tuple;
   dynamically, during runtime of the processing system, determining a page class corresponding to the tuple specification;
   instantiating a page object based on the page class; and
   storing a dynamic page based on the page object in a memory;
   wherein the page object has a structure including an array for each of the one or more data types identified in the tuple specification.

6. The method of claim 5, wherein the page object is an array of tuples of a plurality of tuples.

7. The method of claim 5, further comprising:
   determining whether a pre-existing page class corresponds to the tuple specification; and
   instantiating the page based on the pre-existing page class.

8. The method of claim 5, further comprising:
generating the page class to correspond with the tuple specification; and
loading, using byte code manipulation libraries, the page class to a Virtual Machine during runtime of the event processing system and prior to instantiating the dynamic page.

9. A non-transitory computer-readable storage medium storing a computer program product for processing a data stream comprising events, the computer program product comprising:
computer code for receiving a tuple;
computer code for determining a tuple specification defining a layout of the tuple, wherein the layout identifies one or more data types included in the tuple;
computer code for determining a tuple class corresponding to the tuple specification based on the layout;
computer code for instantiating, based on the particular tuple class, a tuple object that includes an array for a particular data type identified in the tuple specification; and
computer code for storing the tuple object in a memory;
wherein the tuple object has a structure including a particular object which includes an array for each of one or more data types identified in the tuple specification.

10. The non-transitory computer-readable storage medium according to claim 9, the computer program product further comprising:
computer code for generating the particular tuple class to correspond with the tuple specification; and
computer code for loading, using byte code manipulation libraries, the particular tuple class to a Virtual Machine during runtime of the processing system and prior to instantiating the tuple object.

11. The non-transitory computer-readable storage medium according to claim 9, wherein the tuple specification is determined during creation of the data stream in response to a stream creation statement that is issued by a user of the processing system and that indicates the tuple specification; and wherein determining the tuple class corresponding to the tuple specification comprises locating, in a cache that contains tuple classes that were dynamically generated during the runtime of the processing system, a particular tuple class whose members have data types that are identical to the one or more data types identified by the layout.

12. The non-transitory computer-readable storage medium according to claim 9, wherein the tuple object has a structure including a particular object which includes a multi-element data structure for each of one or more data types identified in the tuple specification.

13. A system for processing a data stream comprising events, the system including a processor and a memory device including instructions that, when executed by the processor, cause the processor to:
receive a tuple;
determine a tuple specification defining a layout that identifies a data type included in the tuple;
determine a tuple class corresponding to the tuple specification;
instantiate an array-including tuple object based on the tuple class; and
store the tuple object in a memory;
wherein the tuple object has a structure including a particular object which includes an array for each of one or more data types identified in the tuple specification.

14. The system according to claim 13, wherein the instructions, when executed by the processor, further cause the processor to:
generate the tuple class to correspond with the tuple specification; and
load, using byte code manipulation libraries, the tuple class to a Virtual Machine during runtime of the processing system and prior to instantiating the tuple object.

15. The system according to claim 13, wherein the tuple object has a structure including a particular object which includes a multi-element data structure for each of one or more data types identified in the tuple specification.

* * * * *

UNITED STATES PATENT AND TRADEMARK OFFICE
CERTIFICATE OF CORRECTION

| | | |
|---|---|---|
| PATENT NO. | : 8,935,293 B2 | Page 1 of 1 |
| APPLICATION NO. | : 12/396464 | |
| DATED | : January 13, 2015 | |
| INVENTOR(S) | : Park et al. | |

It is certified that error appears in the above-identified patent and that said Letters Patent is hereby corrected as shown below:

Title Page, item (56),

On page 2, column 2, under Other Publications, line 8, delete "(WORD'" and insert -- (WORDS' --, therefor.

On page 3, column 2, under Other Publications, line 6, delete "Rerieved" and insert -- Retrieved --, therefor.

Signed and Sealed this
First Day of September, 2015

Michelle K. Lee
*Director of the United States Patent and Trademark Office*